Oct. 4, 1966

W. E. MAULDIN 3,276,745

POWER DRIVEN HOISTING MECHANISM

Filed July 6, 1965

INVENTOR.
William E. Mauldin
BY
Wood, Herron & Evans
ATTORNEYS

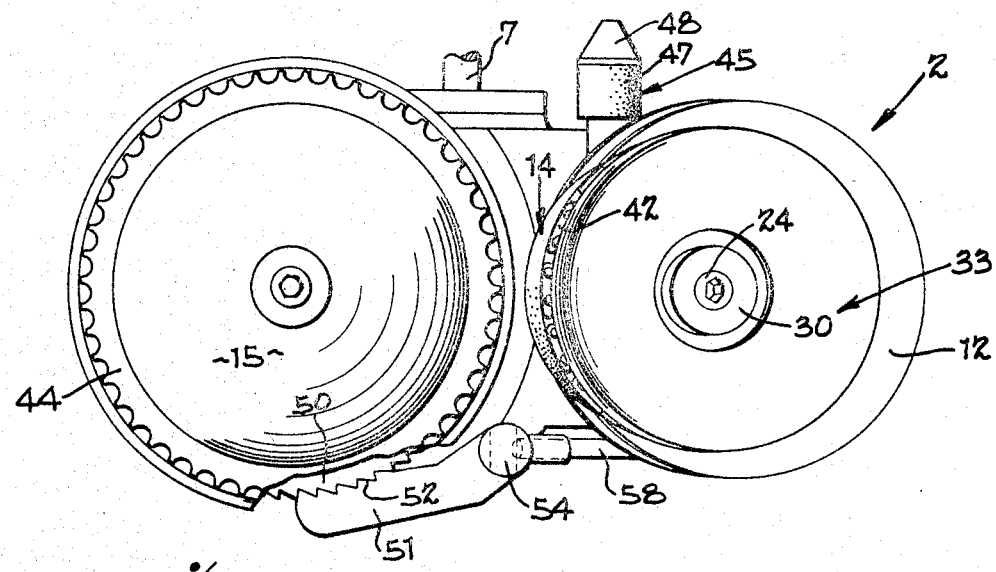
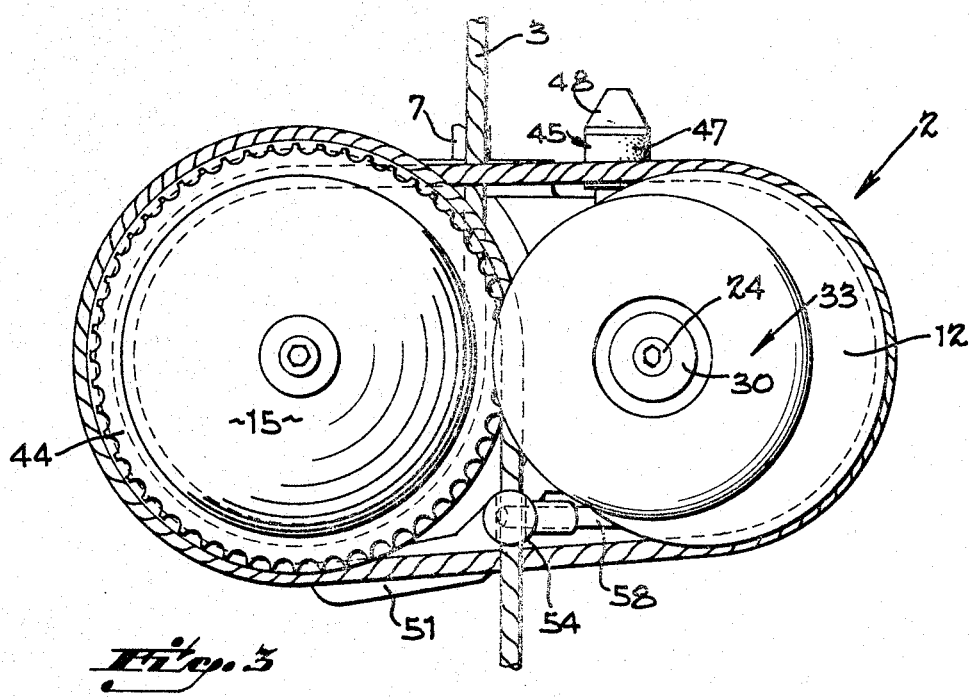

Oct. 4, 1966 W. E. MAULDIN 3,276,745
POWER DRIVEN HOISTING MECHANISM
Filed July 6, 1965 3 Sheets-Sheet 3

INVENTOR
William E. Mauldin
BY
Wood, Herron & Evans
ATTORNEYS

United States Patent Office 3,276,745
Patented Oct. 4, 1966

3,276,745
POWER DRIVEN HOISTING MECHANISM
William E. Mauldin, Cincinnati, Ohio, assignor to Hi-Lo Powered Stirrups, Inc., Cincinnati, Ohio, a corporation of Ohio
Filed July 6, 1965, Ser. No. 469,519
3 Claims. (Cl. 254—150)

This invention relates to power driven hoisting mechanisms of the type disclosed in United States Patent No. 2,938,707. These hoisting mechanisms are of the type having a power driven pulley system through which a single strand of cable is threaded. This cable is suspended from an overhead support and when the pulley system is driven in one direction, the mechanism climbs the cable, and when driven in the opposite direction, the mechanism descends the cable.

More particularly this invention is directed to an improved pulley system for a hoisting mechanism of the above type.

In most instances, these hoisting mechanisms are used in pairs to support free hanging scaffolds such as are customarily used in construction, repair and painting work. In addition, a single hoisting mechanism may be used for raising and lowering an elevator cage of the type used in the construction and other industries.

The pulley system disclosed in Patent No. 2,938,707 includes a driven pulley about which the single strand of cable is wound through 270°, passing down around one side of the pulley and then around the pulley, coming off the top. From this point, the cable extends around a guide pulley that is to one side of the driven pulley. Leaving the guide pulley, the cable passes around the bottom of a tension pulley that is mounted on the same axis as the driven pulley, the cable passing around the tension pulley through 270° from whence it extends downwardly. Further, as disclosed in the patent, there is provided a friction clutch between the driven pulley and the tension pulley. Except for the friction couple between the driven pulley and the tension pulley, the tension pulley is otherwise free to rotate independently of the driven pulley. An important consideration is that the tension pulley is slightly larger in diameter than the driven pulley. Thus, as the driven pulley is rotated in a direction to cause the hoisting mechanism to climb the cable the difference in diameter of the driven pulley and the tension pulley causes the tension pulley to keep the cable taut. Of course, there has to be a certain amount of slippage in the friction clutch couple between the driven pulley and the tension pulley when this occurs. When the mechanism is driven in the opposite direction to descend the cable, means are provided to lock the friction clutch. In these circumstances, the tension pulley is braked so that it again keeps the cable taut. In this pulley system it is necessary to employ a pressure wheel to hold the cable in intimate contact with the tension pulley at the place where the cable leaves the tension pulley to hang downwardly freely therefrom. In the patented mechanism this has been a critical area and the improvements of this invention are concerned primarily with this area.

In the patented mechanism slippage has occurred in this critical area causing undue wear, necessitating maintenance more often than is desired. In addition, it is found that high pressure was required in this area to hold the cable positively in the groove on the tension pulley. In the past, this has caused excessive wear on the cable, requiring replacement at a greater rate than is considered economical. Further, it was found that the cable was flattened by the pressure required which resulted in a twisting of the cable giving rise to hazardous operational problems.

The primary objective of this invention has been to alleviate the above mentioned problems and to further improve the hoisting mechanism disclosed in Patent 2,938,707. Thus, the pulley system of this invention has been improved so as to increase longevity of certain parts, to provide for more simplicity of operation, particularly at start-up time, to create greater dependability during operation, and to provide for an increase in load capacity of the mechanism.

The objectives of this invention have been obtained by the elimination of certain parts, the elimination of adjustment devices that were thought to be necessary and the general overall simplification of the pulley system such that a more compact and less complex mechanism has been provided.

Other objectives and novel features of the invention will become more readily apparent from the following detailed description, taken in conjunction with the accompanying drawings in which:

FIGURE 2 is a side view of the improved pulley system, here shown in the open or threading position.

FIGURE 3 is a side view of the improved pulley system, here shown in the closed or operating position.

Figure 1:
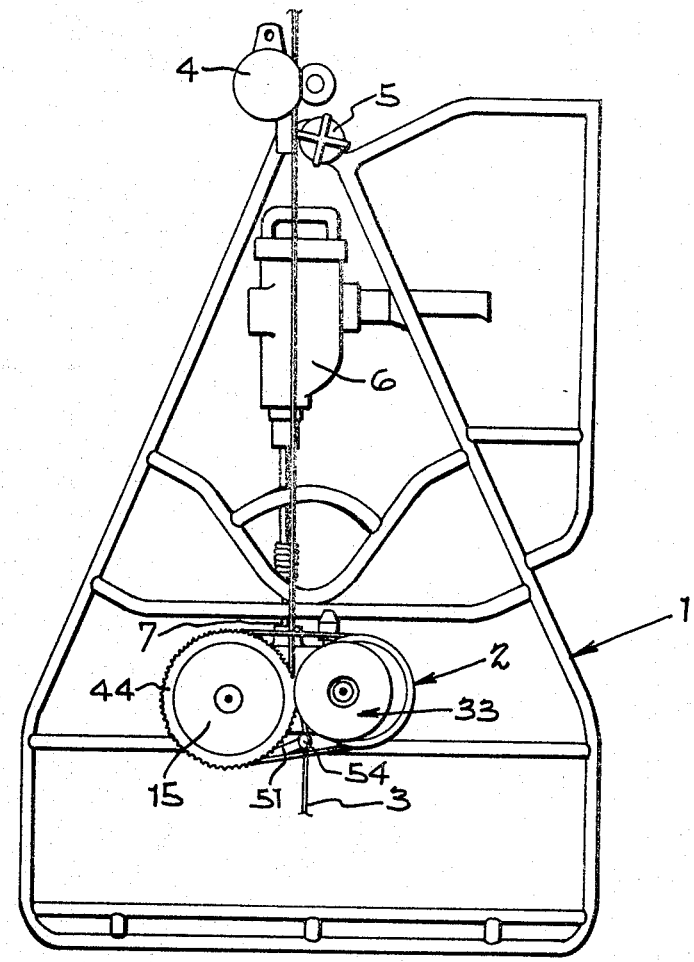
FIGURE 1 is a general side elevational view of a scaffold stirrup schematically depicting the hoisting mechanism mounted thereon.

Referring to the drawings, in the general side elevation view of FIGURE 1, a stirrup frame 1 has mounted thereon an improved pulley system 2 of this invention, through which is threaded in operative engagement a freely hanging cable 3 which provides vertical support for a scaffold system. A cable guide means 4 is provided at the apex of the stirrup, as is a safety locking means 5 which is more fully described in U.S. Patent No. 2,931,466. Power drive means is provided by power unit 6 through which, by means of shaft 7, is transmitted the power required by the pulley system 2 to operably raise and lower the scaffold. It is, of course, by means of the novel pulley system arrangement as driven by the power unit, that the scaffold ascends or descends the freely hanging cable. The basic configuration of the hoisting mechanism components, as immediately heretofore described, is the same as that of Patent No. 2,938,707 and portions thereof, other than the novel and improved pulley system 2, are more fully and completely described therein.

Figure 4:
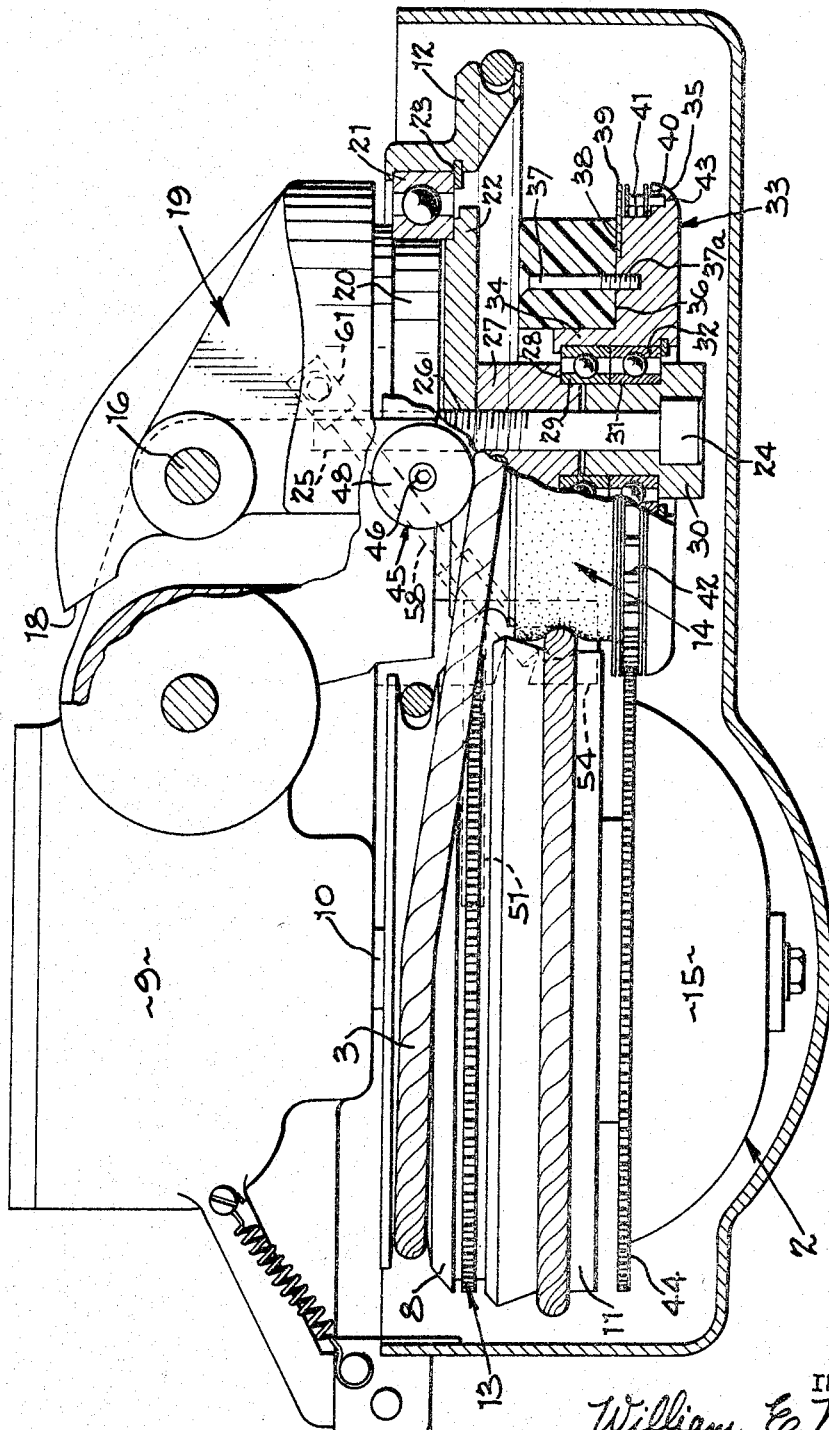
FIGURE 4 is a top and partially cut away view of the improved pulley system wherein the novel improvements may be clearly seen.

FIGURE 4 depicts through a top and partially cut away view, the primary elements of the improved pulley system 2. The power unit 6 transmits power to the traction pulley 8 by means of a worm and gear assembly housed in casing 9. The shaft 10 is integrally connected with the worm and gear assembly and a traction pulley 8, thereby directly transmitting power from the power unit 6 to the traction pulley 8. The power transmission unit, which is housed in casing 9, is set forth in detail in Patent No. 2,938,707.

By means of a tension pulley 11, a guide pulley 12, a double faced clutch plate 13, and a pressure wheel 14, the cable 3 is kept in constant tension. This is accomplished by means of the spatial arrangement of the above-mentioned components and relative difference in diameters of the tension and traction pulleys, the tension pulley being of a slightly larger diameter and thus creates a tension, the value of which will not exceed a predetermined value. The predetermined tension value is set by means of the clutch mechanism, which allows slippage between the tension and traction pulleys when too great a value of tension is reached, and may be varied by adjusting spring means housed in casing 15, said spring means being the means by which the traction pulley, tension pulley and clutch are urged into intimate relationship. The primary elements of the traction pulley-clutch-tension pulley assembly are more fully described in the patent to which reference has been made.

The novel feature of the improved pulley system 2 lies in the pressure wheel 14, guide pulley 12 assembly relationship and the relationship of that assembly to the remainder of the system. The pressure wheel guide pulley assembly is attached to the main casing 9 by means of an arm 19 and hinge arrangement 16. Thus, when in the open position, as shown in FIGURE 2, the assembly pivots about the pin 16, said open position being limited by the abutting of face 18 against the side of casing 9.

Arm 19 is the base for, and mounts the pressure roller-guide pulley assembly. As shown, the forward portion of arm 19 is cylindrical and configurated to provide a stepped, annular bearing shoulder 20 upon which guide pulley 12 is mounted by means of a ball bearing ring 21 for free rotation. A bearing plate 22 and a snap-in ring 23 are provided for holding the ball bearing ring 21 in place.

The entire assembly making up the pressure wheel 14 and the guide pulley 12 is fastened to arm 19 by means of a single bolt 24. The inner end of this bolt threads into an appropriately tapped bore that is in the face of the forward, cylindrical part of arm 19. This is best shown in FIGURE 4 by dotted lines 25. Bolt 24 extends through an appropriate bore 26 in bearing plate 22. A spacer sleeve 27 surrounds bolt 24 with the inner end thereof in contact with the bearing plate 22. The outer end of this spacer sleeve has a shoulder therein as shown at 28 to provide a seat for a ball bearing ring 29. A bearing cap 30 also surrounds bolt 24 at the outer end thereof. This bearing cap is configurated to provide a shoulder 31 for a second ball bearing ring 32. It may be seen therefore from FIGURE 4 that when bolt 24 is tightened the bearing cap 30 tightly squeezes the inner races of ball bearing rings 29 and 32 to lock them in place, and, further, tightly squeezes the spacer sleeve 27 against the bearing plate 22 which in turn holds the inner race of the large ball bearing ring 21 in place on the seat provided by shoulder 20.

Pressure wheel 14 consists generally of two parts, one being a cast wheel 33 having a hub portion 34 and an annular flange portion 35. The other is a resilient annulus 36 that is made of a plastic material such as a polyurethane that is identified in the trade as Plastic No. 6381–8. The hub portion 34 and the annular flange portion 35 of the cast wheel 33 define between them a seat for the rubber annulus 36 and the annulus is held in place by means of a series of bolts such as the ones shown at 37, the bolts extending through appropriate bores and threading into the annular flange portion 35 as shown at 37a. A narrow seat 38 is provided between the annulus and the annular flange 36 to receive a chain retainer ring 39. A shoulder 40 is machined in the outer periphery of annular flange 35 such that it defines a groove 41 extending around the cast wheel 33. A pitch chain 42 is disposed in groove 41 to extend completely around the pressure wheel. It is locked to the pressure wheel so that it cannot move by means of pins such as the one shown at 43 in FIGURE 4, pins extending into appropriate bores in the annular flange portion 35 of the assembly.

Pitch chain 42 normally is engaged with a sprocket 44 that is part of the assembly making up tension pulley 11. Thus, in the condition of the mechanism illustrated in FIGURE 4, the pressure wheel and tension pulley are geared together so as to rotate at the same peripheral speed. As shown, it is the pressure wheel that is driven by means of the sprocket on the tension pulley assembly since the pressure wheel is free to rotate on the two ball bearing rings 29 and 32. Further, the pressure wheel assembly and the tension pulley assembly are free to rotate at speeds that are independent of speeds at which the traction pulley and the guide pulley are adapted to rotate. However, as will be explained all of these elements are tied together by cable 3 during the operation of the mechanism.

Arm 19 mounts a transfer roller 45. This transfer roller is fastener in place by means of a bolt 46 and passes down through roller 45 and into an appropriate bore (not shown) in arm 19. Appropriate bearings are provided so that a resilient facing 47 for the roller is free to rotate. A conical cap 48 is provided for the top of roller 47 to assist in the initial thread of the cable through the pulley system as will be explained.

Figure 5:
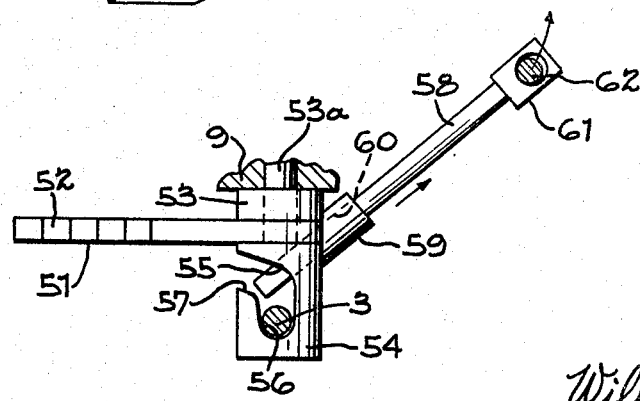
FIGURE 5 is a fragmentary view, partly in section, showing a preferred embodiment of a cable guide device.

The clutch 13 consists essentially of a plate, the outer periphery of which is notched as shown in FIGURE 2 as at 50 to provide a circular ratchet. The clutch is constrained to rotate at one direction only by means of a pawl 51 having teeth 52 thereon adapted to mate with the ratchet 50. Thus, as shown in FIGURE 2, the clutch can rotate only in a clockwise direction. The pawl is fastened to the forward face of the casing 9. As shown in FIGURE 5, a cylindrical sleeve 53 is interposed between the pawl and the forward face of casing 9. A pin 53a is provided to pull the sleeve and the pawl in place as an assembly. Further, a combined cable guide and latch device 54 is mounted on the pawl in the outer side thereof opposite sleeve 53. This device is generally cylindrical and it has an arcuate slot 55 cut into it to define a guide portion 56 and a throat 57 that is in communication with the guide portion. Cable 3 is retained in the guide portion 56 of the slot by means of a retainer pin 58. The retainer pin is slidably mounted in a sleeve 59 that is preferably welded in place at the side of the cylindrical members making up sleeve 52 and the cable guide and latch device. This sleeve has a bore through it that continues on in through the guide device as best shown at 60 in FIGURE 5. The opposite end of retainer pin 58 has a head 61 thereon. A pin 62, about which the retainer pin 58 is adapted to pivot, depends from the underside of the arm 19 and when the arm is swung from the position shown in FIGURES 3 and 4 to the position shown in FIGURE 2, the retainer pin 58 is withdrawn from throat 55 so as to permit the cable to be inserted into the guide portion through throat 57.

The arm is swung into the position shown in FIGURE 2, the threading position, or open position, at the time the mechanism is initially engaged with a cable. Thus, the cable guide and latch device 54 is automatically conditioned to receive the cable when the pulley system is open for threading. In this operation the cable is threaded as shown in FIGURES 3 and 4 by looping the cable around the traction pulley 8 through 270°, thence past the transfer roller 45, around the far side of guide pulley 12, then under tension pulley 11 around it through 270°, and thence downwardly between the tension pulley and the pressure roller 14. When weight is placed on cable 3 above the mechanism, the two runs of the cable going to and from the guide pulley 12 tighten up. This occurs just as soon as the power unit is turned on to drive the mechanism in an upward direction. This not only tensions the pulley, but the tendency for the tension pulley to take up more cable than is coming off the smaller diameter traction pulley, causes the pressure roller to move into intimate contact with that portion of the cable between it and the tension pulley 11. This automatically places the right amount of pressure on the cable so that it is held in intimate contact with the tension pulley.

In ascending a cable, as disclosed in Patent No. 2,938,-707, the tractor pulley is driven in the clockwise direction of FIGURE 3. This is also true of the guide pulley and the traction pulley. The larger diameter of the tension pulley 11 keeps the cable taut. In descending a cable, the traction pulley is driven in the counterclockwise direction of FIGURE 3. At this time, the pawl and ratchet mechanism 50–51 prevents the clutch from rotating. The clutch then acts as a brake for the tension pulley which holds the cable taut in the system.

The stresses on the runs of cable between the left-hand members and the right-hand members of the pulleys insure that the resilient annulus 36 presses tightly against the cable. Further, the geared relationship of the sprocket 44 that is tied in with the tension pulley and the pitch chain 42 that is tied in with the resilient annulus 14 insures that no slippage can occur between either the tension pulley and the cable or between the cable and the resilient annulus 36. Consequently an area that has given rise to a considerable amount of wear and unsatisfactory operational conditions in the past has been improved, initial threading has been made much simpler, fewer parts are required and a safer, more structurally sound hoisting mechanism has been provided.

Having described my invention, I claim:

1. In a hoisting mechanism of the type for ascending and descending a freely hanging, single strand of cable, there being a drive shaft to drive said mechanism, a traction pulley on said drive shaft and adapted to be positively driven thereby, a tension pulley having a slightly larger diameter than said traction pulley, means mounting said tension pulley on said drive shaft for free rotative movement adjacent to said traction pulley, a double faced friction clutch interposed between said traction pulley and said tension pulley, means urging said traction and tension pulleys into intimate contact with the respective faces of said friction clutch, and pawl and ratchet means associated with said clutch whereby said clutch is adapted to rotate in one direction only, the improvement comprising an arm, means for mounting said arm at one side of said drive shaft, a pressure wheel, means mounting said pressure wheel about an axis of rotation established on said arm for free rotative movement, a guide pulley, means mounting said guide pulley on said arm for free rotative movement about said axis of rotation, said cable being wound from around said traction pulley to said guide pulley to said tension pulley thereby providing means to place said pressure wheel into intimate contact with said tension pulley and cable and thereby also providing means to place said guide pulley into operational relationship with said tension and traction pulley, and means to positively relate said pressure wheel to said tension pulley, for rotation therewith.

2. In a hoisting mechanism of the type for ascending and descending a freely hanging, single strand of cable, there being a drive shaft to drive said mechanism, a traction pulley on said drive shaft and adapted to be positively driven thereby, a tension pulley having a slightly larger diameter than said traction pulley, means mounting said tension pulley on said drive shaft for free rotative movement adjacent to said traction pulley, a double faced friction clutch interposed between said traction pulley and said tension pulley, means urging said traction and tension pulleys into intimate contact with the respective faces of said friction clutch, and pawl and ratchet means associated with said clutch whereby said clutch is adapted to rotate in one direction only, the improvement comprising an arm, means for mounting said arm for rotative movement about an axis at one side of said drive shaft, a pressure wheel having a resilient annulus thereon, means mounting said pressure wheel about an axis of rotation established on said arm for free rotative movement, a guide pulley, means mounting said guide pulley on said arm for free rotative movement about said axis of rotation, said cable being wound from around said traction pulley to said guide pulley to said tension pulley thereby providing means to place said resilient annulus into intimate contact with said tension pulley and cable and thereby also providing means to place said guide pulley into operational relationship with said tension and traction pulleys, said arm adapted to move from a first position in which said resilient annulus is adapted to press a cable on said tension pulley into intimate contact with said tension pulley and a second position in which said pressure wheel is spaced from said tension pulley, and means to positively relate said pressure wheel to said tension pulley when said arm is in said first position for rotation therewith.

3. In a hoisting mechanism of the type for ascending and descending a freely hanging, single strand of cable, there being a drive shaft to drive said mechanism, a traction pulley on said drive shaft and adapted to be positively driven thereby, a tension pulley having a slightly larger diameter than said traction pulley, means mounting said tension pulley on said drive shaft for free rotative movement adjacent to said traction pulley, a double faced friction clutch interposed between said traction pulley and said tension pulley, means urging said traction and tension pulleys into intimate contact with the respective faces of said friction clutch, and pawl and ratchet means associated with said clutch whereby said clutch is adapted to rotate in one direction only, the improvement comprising an arm, means mounting said arm for limited rotative movement about an axis to one side of and at right angles to said drive shaft, a guide pulley, means mounting said guide pulley about an axis of rotation for free rotative movement on said arm, a pressure wheel having a resilient annulus thereon, means mounting said pressure wheel about said axis of rotation on said arm for free rotative movement, said cable being wound from around said traction pulley to said guide pulley to said tension pulley, thereby providing means to place said resilient annulus into intimate contact with said tension pulley and cable and thereby also providing means to place said guide pulley into operational relationship with said tension and traction pulleys, said arm adapted to move from a first position in which said resilient annulus is adapted to press a cable on said tension pulley into intimate contact with said tension pulley and a second position in which said pressure wheel is spaced from said tension pulley, roller means to guide said cable from said traction pulley to said guide pulley, and gear means adapted to relate said pressure wheel assembly to said tension pulley when said arm is in said first position for rotation therewith.

References Cited by the Examiner

UNITED STATES PATENTS

| | | | |
|---|---|---|---|
| 2,819,789 | 1/1958 | Lang | 254—167 |
| 2,938,707 | 5/1960 | Allenbaugh | 254—150 |

EVON C. BLUNK, *Primary Examiner.*

H. C. HORNSBY, *Assistant Examiner.*